United States Patent
Lei et al.

(10) Patent No.: US 10,334,608 B2
(45) Date of Patent: Jun. 25, 2019

(54) METHOD AND APPARATUS FOR DUAL CONNECTIVITY

(71) Applicant: Nokia Technologies Oy, Espoo (FI)

(72) Inventors: Yixue Lei, Beijing (CN); Haipeng Lei, Beijing (CN); Zhi Zhang, Beijing (CN); Liu Yang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 89 days.

(21) Appl. No.: 14/903,172

(22) PCT Filed: Jul. 30, 2013

(86) PCT No.: PCT/CN2013/080403
§ 371 (c)(1),
(2) Date: Jan. 6, 2016

(87) PCT Pub. No.: WO2015/013881
PCT Pub. Date: Feb. 5, 2015

(65) Prior Publication Data
US 2016/0150586 A1     May 26, 2016

(51) Int. Cl.
*H04W 72/08* (2009.01)
*H04W 36/02* (2009.01)
*H04W 36/30* (2009.01)
*H04W 76/15* (2018.01)
*H04W 92/20* (2009.01)
*H04W 36/00* (2009.01)

(52) U.S. Cl.
CPC ....... *H04W 72/085* (2013.01); *H04W 36/023* (2013.01); *H04W 36/30* (2013.01); *H04W 76/15* (2018.02); *H04W 36/0069* (2018.08); *H04W 92/20* (2013.01)

(58) Field of Classification Search
CPC . H04W 76/025; H04W 36/023; H04W 36/30; H04W 36/0055; H04W 72/085; H04W 92/20
USPC ........................................................ 370/332
See application file for complete search history.

(56) References Cited

U.S. PATENT DOCUMENTS

| | | | |
|---|---|---|---|
| 2002/0031144 A1* | 3/2002 | Barton | H04L 12/66 370/468 |
| 2003/0176187 A1 | 9/2003 | Menzel et al. | |
| 2004/0248615 A1 | 12/2004 | Purkayastha et al. | |

(Continued)

FOREIGN PATENT DOCUMENTS

| | | |
|---|---|---|
| CN | 1795688 A | 6/2006 |
| CN | 102396262 A | 3/2012 |
| WO | WO-2013/051975 A1 | 4/2013 |

OTHER PUBLICATIONS

"3rd Generation Partnership Project;Technical Specification Group Radio Access Network;Evolved Universal Terrestrial Radio Access Network(E-UTRAN); S1 Application Protocol (S1AP) (Release 11)", 3GPP TS 36.413, V11.3.0, Mar. 2013, pp. 1-274.

(Continued)

*Primary Examiner* — Chi Tang P Cheng
(74) *Attorney, Agent, or Firm* — Harrington & Smith

(57) ABSTRACT

A method and apparatus can be configured to determine a redundancy rate. The method can also include mirroring an amount of data from a first node to a second node based upon the determined redundancy rate. The method can also include transmitting a last-data-unit index or a next-data-unit index.

14 Claims, 13 Drawing Sheets

(56) References Cited

U.S. PATENT DOCUMENTS

| | | | |
|---|---|---|---|
| 2005/0157697 A1 | 7/2005 | Lee et al. | |
| 2007/0291695 A1* | 12/2007 | Sammour | H04W 36/02 370/331 |
| 2008/0189360 A1 | 8/2008 | Kiley et al. | 709/203 |
| 2009/0116445 A1* | 5/2009 | Samar | H04W 36/02 370/331 |
| 2010/0091734 A1 | 4/2010 | Park et al. | |
| 2010/0260096 A1 | 10/2010 | Ulupinar et al. | 370/315 |
| 2010/0260097 A1 | 10/2010 | Ulupinar et al. | |
| 2013/0322235 A1* | 12/2013 | Khoryaev | H04W 24/10 370/229 |
| 2014/0226476 A1* | 8/2014 | Bertze | H04L 47/30 370/230.1 |

OTHER PUBLICATIONS

"3rd Generation Partnership Project;Technical Specification Group Radio Access Network;Evolved Universal Terrestrial Radio Access Network (E-UTRAN);X2 application protocol (X2AP) (Release 11)", 3GPP TS 36.423, V11.4.0, Mar. 2013, pp. 1-144.

"3rd Generation Partnership Project;Technical Specification Group Radio Access Network;Evolved Universal Terrestrial Radio Access (E-UTRA);Mobility enhancements in heterogeneous networks (Release 11)", 3GPP TS 36.839, V11.1.0, Dec. 2012, pp. 1-53.

Extended European Search Report received for corresponding European Patent Application No. 13890757.1, dated Dec. 2, 2016, 9 pages.

"Data split options and considerations on U-plane protocolarchitecture for dual-connectivity", 3GPP TSG-RAN Working Group 2, meeting #81 bis, R2-131054, Agenda: 7.2, Nokia Corporation, Apr. 15-19, 2013, 9 pages.

Petander, "Bicasting with Buffering and Selective Delivery for Fast Handovers for Mobile IPv6", draft-petander-mipshop-fmipv6-bbsd-00.txt, Internet Draft, Mipshop Working Group, Oct. 16, 2006, pp. 1-15.

International Search Report and Written Opinion received for corresponding Patent Cooperation Treaty Application No. PCT/CN2013/080403 , dated May 6, 2014, 19 pages.

* cited by examiner

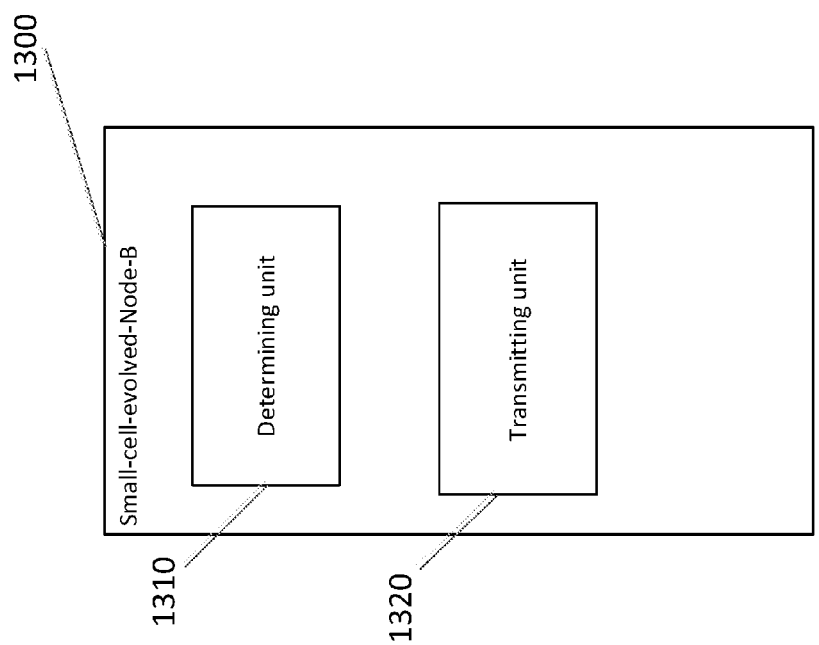

METHOD AND APPARATUS FOR DUAL CONNECTIVITY

RELATED APPLICATION

This application was originally filed as PCT Application No. PCT/CN2013/080403 filed Jul. 30, 2013.

BACKGROUND

Field

Embodiments of the invention relate to dual connectivity by a user equipment.

Description of the Related Art

Long-term Evolution (LTE) is a standard for wireless communication that seeks to provide improved speed and capacity for wireless communications by using new modulation/signal processing techniques. The standard was proposed by the $3^{th}$ Generation Partnership Project (3GPP), and is based upon previous network technologies. Since its inception, LTE has seen extensive deployment in a wide variety of contexts involving the communication of data.

SUMMARY

According to a first embodiment, a method can comprise determining a redundancy rate. The method may also include mirroring an amount of data from a first node to a second node based upon the determined redundancy rate. The method may also include transmitting a last-data-unit index or a next-data-unit index.

In the method of the first embodiment, the transmitting the last-data-unit index or the next-data-unit index comprises transmitting to a user equipment or the second node.

In the method of the first embodiment, the method may further comprise transmitting an indication to a user equipment that is connected to the first node. The indication indicates to the user equipment to switch connection from the first node to the second node.

In the method of the first embodiment, the method may further comprise receiving, by the first node, information relating to a transmission capability of the second node.

In the method of the first embodiment, the method may further comprise monitoring a delay between the first node and the second node.

In the method of the first embodiment, determining the redundancy rate comprises determining the redundancy rate based on a received transmission capability and a monitored delay.

In the method of the first embodiment, the receiving comprises receiving, by a macro-evolved-Node-B, information relating to a transmission capability of a small-cell-evolved-Node-B.

In the method of the first embodiment, the receiving comprises receiving information relating to a physical-layer-transmission capability of the second node.

In the method of the first embodiment, the determining the redundancy rate comprises determining an amount of data to be mirrored each time mirroring occurs.

According to a second embodiment, an apparatus may comprise means arranged to perform the method according to the first embodiment.

According to a third embodiment, an apparatus can comprise at least one processor. The apparatus can also include at least one memory including computer program code. The at least one memory and the computer program code can be configured, with the at least one processor, to cause the apparatus at least to determine a redundancy rate. The apparatus can also mirro an amount of data to a node based upon the determined redundancy rate. The apparatus can also transmit a last-data-unit index or a next-data-unit index.

In the apparatus of the third embodiment, the transmitting the last-data-unit index or the next-data-unit index comprises transmitting to a user equipment or the node.

In the apparatus of the third embodiment, the apparatus can further transmit an indication to a user equipment that is connected to the apparatus. The indication indicates to the user equipment to switch connection from the apparatus to the node.

In the apparatus of the third embodiment, the apparatus can further receive information relating to a transmission capability of the node.

In the apparatus of the third embodiment, the apparatus can further monitor a delay between the apparatus and the node.

In the apparatus of the third embodiment, determining the redundancy rate comprises determining the redundancy rate based on a received transmission capability and a monitored delay.

In the apparatus of the third embodiment, the receiving comprises receiving information relating to a transmission capability of a small-cell-evolved-Node-B.

In the apparatus of the third embodiment, the receiving comprises receiving information relating to a physical-layer-transmission capability of the node.

In the apparatus of the third embodiment, the determining the redundancy rate comprises determining an amount of data to be mirrored each time mirroring occurs.

According to a fourth embodiment, a computer program product can be embodied on a computer readable medium. The computer program product can be configured to control a processor to perform a method according to the first embodiment.

According to a fifth embodiment, a method can comprise receiving, by a second node, mirrored data from a first node. The method can also include receiving a last-data-unit index or a next-data-unit index. The method can also include beginning transmission to a user equipment in accordance with the received data-unit index.

In the method of the fifth embodiment, the method can further comprise transmitting, by a second node, information relating to a transmission capability of the second node to a first node.

In the method of the fifth embodiment, the method can further comprise monitoring a delay between the first node and the second node.

In the method of the fifth embodiment, the receiving the mirrored data comprises receiving, by a small-cell-evolved-Node-B, the mirrored data from a macro-evolved-Node-B.

In the method of the fifth embodiment, the receiving the last-data-unit index or the next-data-unit index comprises receiving from the first node or a user equipment.

According to a sixth embodiment, an apparatus can comprise means arranged to perform the method according to the fifth embodiment.

According to a seventh embodiment, an apparatus can include at least one processor. The apparatus can include at least one memory including computer program code. The at least one memory and the computer program code can be configured, with the at least one processor, to cause the apparatus at least to receive mirrored data from a node. The apparatus can also receive a last-data-unit index or a nextdata-unit index. The apparatus can also begin transmission to a user equipment in accordance with the received data-unit index.

In the apparatus of the seventh embodiment, the apparatus is further caused to transmit information relating to a transmission capability of the apparatus to the node.

In the apparatus of the seventh embodiment, the apparatus is further caused to monitor a delay between the node and the apparatus.

In the apparatus of the seventh embodiment, the receiving the mirrored data comprises receiving the mirrored data from a macro-evolved-Node-B.

In the apparatus of the seventh embodiment, the receiving the last-data-unit index or the next-data-unit index comprises receiving from the node or a user equipment.

According to an eighth embodiment, a computer program product can be embodied on a computer readable medium. The computer program product can be configured to control a processor to perform a method according to a fifth embodiment.

According to a ninth embodiment, a method can include receiving, by a user equipment, first data. The method can also include receiving, by the user equipment, an indication of a time to switch between a first node and a second node. The method can also include transmitting a last-data-unit index or a next-data-unit index to the first node or to the second node.

In the method of the ninth embodiment, the method can further comprise receiving second data from the first node or the second node, wherein the second data is received beginning in accordance with the last-data-unit index or the next-data-unit index.

In the method of the ninth embodiment, the receiving the indication comprises receiving an indication of a time to switch between a macro-evolved-Node-B and a small-cell-evolved-Node-B.

According to a tenth embodiment, an apparatus can comprise means arranged to perform the method according to the ninth embodiment.

According to an eleventh embodiment, an apparatus can comprise at least one processor. The apparatus can include at least one memory including computer program code. The at least one memory and the computer program code configured, with the at least one processor, to cause the apparatus at least to receive first data. The apparatus can also receive an indication of a time to switch between a first node and a second node. The apparatus can also transmit a last-data-unit index or a next-data-unit index to the first node or to the second node.

In the apparatus of the eleventh embodiment, the apparatus is further caused to receive second data from the first node or the second node. The second data is received beginning in accordance with the last-data-unit index or the next-data-unit index.

In the apparatus of the eleventh embodiment, the receiving the indication comprises receiving an indication of a time to switch between a macro-evolved-Node-B and a small-cell-evolved-Node-B.

According to a twelfth embodiment, a computer program product can be embodied on a computer readable medium. The computer program product can be configured to control a processor to perform a method according to the ninth embodiment.

According to a thirteenth embodiment, a method can comprise receiving, by a first node, an indication of whether a second node has fully transmitted mirrored data to a user equipment. The method can also include determining a redundancy rate based on the indication. The redundancy rate is reduced if the indication indicates that the second node fully transmitted the mirrored data to the user equipment, and the redundancy rate is increased if the indication indicates that the second node did not fully transmit the mirrored data to the user equipment.

In the method of the thirteenth embodiment, the receiving comprises receiving, by a macro-evolved-Node-B, an indication of whether a small-cell-evolved-Node-B has fully transmitted mirrored data to the user equipment.

In the method of the thirteenth embodiment, the determining the redundancy rate based on the indication comprises determining an amount of data to be mirrored each time mirroring occurs.

According to a fourteenth embodiment, an apparatus can include means arranged to perform the method according to the thirteenth embodiment.

According to a fifteenth embodiment, an apparatus can include at least one processor. The apparatus can also include at least one memory including computer program code. The at least one memory and the computer program code can be configured, with the at least one processor, to cause the apparatus at least to receive an indication of whether a node has fully transmitted mirrored data to a user equipment. The apparatus can also determine a redundancy rate based on the indication. The redundancy rate is reduced if the indication indicates that the node fully transmitted the mirrored data to the user equipment, and the redundancy rate is increased if the indication indicates that the node did not fully transmit the mirrored data to the user equipment.

In the apparatus of the fifteenth embodiment, the receiving comprises receiving, by a macro-evolved-Node-B, an indication of whether a small-cell-evolved-Node-B has fully transmitted mirrored data to the user equipment.

In the apparatus of the fifteenth embodiment, the determining the redundancy rate based on the indication comprises determining an amount of data to be mirrored each time mirroring occurs.

According to a sixteenth embodiment, a computer program product can be embodied on a computer readable medium. The computer program product can be configured to control a processor to perform a method according to the thirteenth embodiment.

According to a seventeenth embodiment, a method can comprise determining whether mirrored data has been fully transmitted to a user equipment. The method can also include transmitting, by a second node, an indication of whether the mirrored data has been fully transmitted, wherein the indication is transmitted to a first node.

In the method of the seventeenth embodiment, the transmitting the indication of whether the mirrored data has been fully transmitted comprises transmitting, by a small-cell-evolved-Node-B, an indication of whether the mirrored data has been fully transmitted, and the first node is a macro-evolved-Node-B.

According to an eighteenth embodiment, an apparatus can comprise means arranged to perform the method according to the seventeenth embodiment.

According to a nineteenth embodiment, an apparatus can comprise at least one processor. The apparatus can include at least one memory including computer program code. The at least one memory and the computer program code can be configured, with the at least one processor, to cause the apparatus at least to determine whether mirrored data has been fully transmitted to a user equipment. The apparatus can transmit an indication of whether the mirrored data has been fully transmitted, wherein the indication is transmitted to a node.

In the apparatus of the nineteenth embodiment, the transmitting the indication of whether the mirrored data has been fully transmitted comprises transmitting an indication of whether the mirrored data has been fully transmitted, and the node is a macro-evolved-Node-B.

According to twentieth embodiment, a computer program product can be embodied on a computer readable medium. The computer program product can be configured to control a processor to perform a method according to the seventeenth embodiment.

BRIEF DESCRIPTION OF THE DRAWINGS

For proper understanding of the invention, reference should be made to the accompanying drawings, wherein:

FIG. 13 illustrates an apparatus according to embodiments of the invention.

DETAILED DESCRIPTION

Certain embodiments of the present invention relate to dual connectivity by a user equipment.

Embodiments of the present invention are related to small-cell enhancements, such as 3GPP Release-12 small-cell enhancements, for example. One embodiment of the present invention is directed to time-division-multiplexing-based (TDM-based) dual connectivity for a user equipment (UE) with a single receiver/transmitter (RX/TX).

Providing TDM-based dual connectivity for the UE with a single RX/TX is to allow the UE to switch between receiving/transmitting with a macro-evolved-Node-B (MeNB) and a small-cell-evolved-Node-B (SeNB) using one RX/TX. By allowing the UE to switch between the MeNB and SeNB, the cost of the radio-frequency (RF) modules of the UE can be reduced. The UE can have both downlink (DL) and uplink (UL) connections with the MeNB and the SeNB in a time-division-multiplexing (TDM) manner. Such dual connectivity can be applicable to different dual connectivity architecture options.

Figure 1:
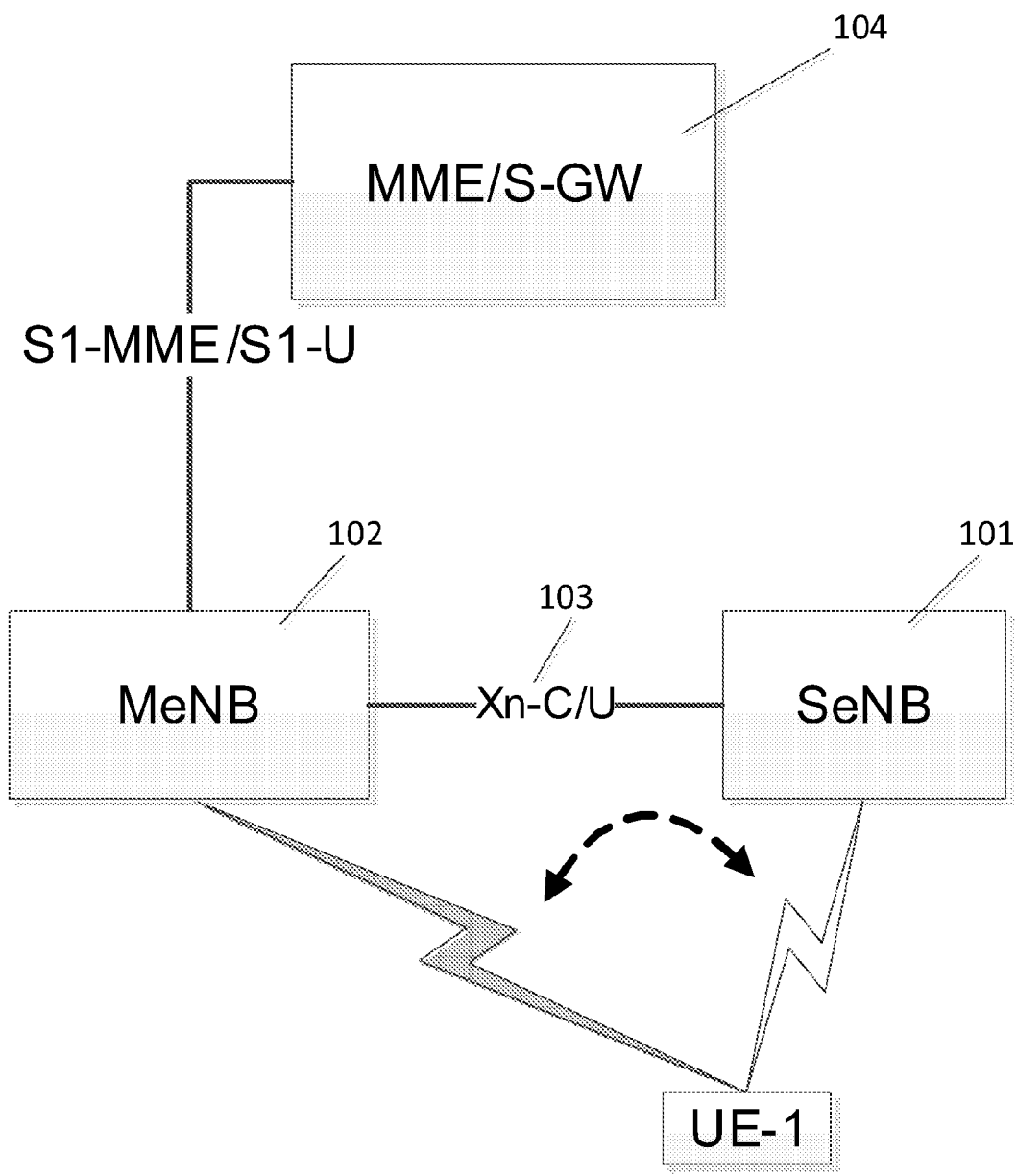
FIG. 1 illustrates one example of a U-plane that can implement one embodiment of the present invention.

FIG. 1 illustrates one example of a U-plane that can implement one embodiment of the present invention. In the example shown in FIG. 1, there is no direct backhaul connection (S1-MME/S1-U) from the SeNB 101 to the core network (CN). There is an Xn interface 103 between the MeNB 102 and the SeNB 101. In other possible dual connectivity architecture options, there may be direct backhaul from the SeNB 101 to the CN. In these dual connectivity architecture options, a data split can happen in the serving gateway (S-GW) 104 instead of at the macro eNB 102, although such splitting can still be done by the MeNB 102. One embodiment of the present invention can be directed to dual connectivity architecture options without direct backhaul from the SeNB 101 to the CN.

Traditionally, performing hand-over generally establishes a new data path between a user equipment (UE) and a target eNB. When establishing the new data path, a "PATH SWITCH" message will generally be transmitted to change a General-Packet-Radio-Service-Tunneling-Protocol (GTP) tunnel endpoint with a serving gateway (S-GW) from a source eNB to the target eNB. Thus, downlink data can go directly to the target eNB for the relevant UE. However, in certain embodiments of the present invention, with TDM-based dual connectivity, to hide such intra Evolved Universal Terrestrial Radio Access Network (E-UTRAN) switching behavior from the CN, the downlink data may still first pass the MeNB and then go to the SeNB via the non-ideal backhaul. Hiding switching behavior from the CN allows a reducing of signaling overhead to a core network entity, which can enable large scale deployment of small cells.

One difficulty of dual connectivity relates to the handling of user-plane data while switching between the MeNB and the SeNB for TDM-based dual connectivity. For example, when transmitting downlink (DL) data, a specific TDM switching pattern can be defined by the MeNB and indicated to the UE via a radio interface. For example, in the first 20 subframes, the UE can connect to the MeNB, and, in the next 60 subframes, the UE can then connect to the SeNB with the assumption that a small cell is more adequate for high-speed downlink data transmission due to a better channel condition. The small cell can also be more appropriate for macro radio offloading purposes. During the first 20 subframes, for example, there may be 20 user data units transmitted to the UE (referred to as unit "x," unit "x+1,", ..., unit "x+19," for example). When the UE switches to the SeNB, the unit "x+20" may not be available in the SeNB due to the delay of the non-ideal backhaul. If the backhaul latency is, for example, 25 ms (which might be even higher, such as up to 60 ms, according to Technical Report 36.839), and unit "x+20" is not available in the SeNB, when the UE switches to the SeNB and seeks to receive unit "x+20," there may be additional latency in DL transmission. When the backhaul latency varies, latency jitter will generally be unavoidable. Thus, the quality-of-service (QoS) of the EUTRAN Radio-Access-Bearer (E-RAB), which is being switched, may be violated and may thus result in poor service to end users. Due to the periodic or semi-static switching between the MeNB and the SeNB by the UE, such latency and latency jitter may happen again and again, and thus, this problem should be solved to ensure proper system performance for users.

Traditional handover schemes, such as using a sequence-number exchanging between source and target BSs (base stations) or APs (access points), are generally insufficient to solve the above-described problems of latency and latency jitter.

In contrast to traditional handover schemes, certain embodiments of the present invention do not perform handover when the UE switches between the MeNB and the SeNB. Certain embodiments of the present invention do not need to perform handover because the MeNB can act as an anchoring node for SeNB for TDM-based dual connectivity. The MeNB can act as a serving eNB to the CN side. The problems relating to latency and latency jitter can be solved by data mirroring. Embodiments of the present invention address the above difficulties by proposing a user plane data management scheme over the non-ideal backhaul. In Radio-Access-Network (RAN) 2, there are different UP options over the Xn interface, and embodiments of the present invention are applicable to both (1) the UP option with Packet-Data-Convergence-Protocol (PDCP) Protocol-Data-Unit (PDU) transported between the MeNB and the SeNB, and also (2) the option with Radio-Link-Control (RLC) PDU transported between the MeNB and the SeNB. UP options can refer to the user-plane protocol stack and the kinds of user-data formats that are transported over an interface between MeNB and SeNB, i.e., an Xn interface.

Previous approaches propose dual connectivity using a dual RX/TX, or using an inter-site Carrier Aggregation (CA) with a dual RX and a single TX. However, the previous approaches do not handle any back and forth switching between MeNB and SeNB by the UE.

In one previous approach, such as the approach described within U.S. Patent Application Publication No. 2004/0248615, is directed to handover between a Universal Mobile Telecommunications System (UMTS) and a wireless local area network (WLAN). This previous approach is related to UMTS and WLAN integration and handover between two different Radio Access Technologies (RATs). This previous approach proposes to exchange a packet index to the other RATs. With this previous approach, no redundancy is considered. However, in contrast to this previous approach, embodiments of the present invention provide some redundancy to handle the potential delay and delay jitter over a non-ideal backhaul, as described in more detail below. In embodiments of the present invention, switching between the MeNB and the SeNB may not cause handover at all. As such, a core network side can be hidden of such switching. Embodiments of the present invention can also reduce core network impacts, which can benefit small cell enhancements in LTE Release-12.

Another previous approach, as described by U.S. Patent Application Publication No. 2010/0260097 A1, is directed to a handover procedure for a Long-Term-Evolution (LTE) mobile relay in different scenarios, including handover (HO) from a relay node (RN) to a donor eNB (DeNB), handover between an RN under the DeNB, and handover between DeNBs. All these handover procedures assume that a sequence number is sent between the eNBs, and these handover procedures do not consider the use of redundancy. This previous approach cannot solve the difficulties relating to delay and delay jitters. The relay architecture of the previous approach is merely directed to single connectivity. In contrast to this previous approach, embodiments of the present invention offer TDM-based dual connectivity. With regard to the previous approach, it is generally not possible to maintain dual connectivity with DeNB and RN (relay nodes), or with two RNs, thus handover is needed between them. In embodiments of the present invention, there can be no handover, even as the UE switches between the MeNB and the SeNB to maintain dual connectivity.

In view of the above, embodiments of the present invention propose a user plane data management scheme by using certain redundancies to reduce the latency and the latency jitter that the non-ideal backhaul causes to the downlink data transmission.

In one embodiment, the MeNB takes into consideration a TDM pattern, a buffer status, and/or also a backhaul latency. The MeNB determines which and how much UP data should be mirrored to the SeNB, before switching in Uu interface, such that the UE can receive DL data immediately after the UE has switched from the MeNB to the SeNB. Mirroring data can be generally understood as copying data to the SeNB without immediate removal from the MeNB. The data can be removed from the MeNB once the data is fully transmitted by the SeNB to UE. Such mirroring should allow some redundancy that takes into consideration the changes of the TDM switching pattern, the fluctuation of backhaul latency, and the physical layer transmission capabilities (like modulation-and-coding scheme (MCS), carrier bandwidth, etc.) of the SeNB.

In order to accomplish the above, information relating to the physical layer transmission capabilities of the SeNB may need to be transmitted to the MeNB via backhaul signaling before the MeNB makes the decision on the amount of user plane data mirroring to the SeNB. The MeNB may receive the information relating to the physical layer transmission capabilities via Xn signaling before the switching as well.

The redundancy can be determined based upon the delay jitter, which can be estimated by the MeNB and the SeNB. The redundancy can be expressed as a redundancy rate. The redundancy rate can correspond to an amount of data to be mirrored each time mirroring occurs. The redundancy can also be expressed by a ratio, a percentage, and/or a number of bits, for example.

The TDM pattern can be configured dynamically according to the data amount to be transmitted, the physical layer transmission capability, and also the UE capability. A flexible TDM pattern can achieve a capacity gain for such TDM-based dual connectivity.

As described above, before switching from the MeNB to the SeNB, the MeNB has mirrored a certain amount of user data to the SeNB that depends on the redundancy rate. When switching occurs, the SeNB is informed about when to start sending the DL traffic that is within the mirrored buffer. The SeNB can be informed about the next data unit to be transmitted. Alternatively, the SeNB can be informed about the last data unit that was sent. Upon being informed about the next data unit or the last data unit, the SeNB can determine what data unit should be the next data unit.

In certain embodiments of the present invention, the UE can inform the SeNB of the latest UP data unit index. To accomplish this informing, a new information element (IE) can be added to an existing Radio Resource Control (RRC) message, or a new RRC message dedicated for such purpose can be defined. In one embodiment, a higher priority control plane transport tunnel can be reserved between the MeNB and the SeNB so that an Xn signaling message can be used to indicate the data unit index as well. This can support the TDM-based dual connectivity while minimizing UE impacts. The UP data unit index could be a protocol data unit (PDU) index like a Packet Data Convergence Protocol (PDCP) Sequence Number (SN), a Radio Link Control (RLC) Sequence Number (SN), or a number of bytes, depending on how UP data mirroring is adopted.

Next, embodiments of the present invention can also switch a UE from the SeNB back to the MeNB. Prior to switching from the SeNB back to the MeNB, if the data that was mirrored to the SeNB has already been fully transmitted by the SeNB to the UE (i.e., the SeNB has transmitted all of its data and has run out of data to transmit to the UE), the SeNB should indicate to the MeNB that, in the future, more user data should be mirrored from the MeNB to the SeNB. By mirroring more data from the MeNB to the SeNB, the SeNB radio resource can be used more effectively. Conversely, if the SeNB has not fully transmitted the mirrored data to the UE by the time the UE is supposed to switch from the SeNB back to the MeNB, and the remained rate is higher than a threshold, then the amount of redundancy should be reduced. The remained rate can be considered to be the ratio of non-transmitted data over mirrored data. If this rate is high, it can mean that the redundancy is also high and should be reduced.

During switching from the SeNB to the MeNB, the MeNB should be aware of the latest UP data index which has been successfully transmitted. In certain embodiments, the UE informs the MeNB of the latest UP data unit index which has been transmitted successfully via a Radio Resource Control (RRC) message (via either Packet Data Convergence Protocol (PDCP) or via a Radio-Link-Control (RLC) Protocol-Data-Unit (PDU)). The MeNB can thus start transmitting from the next packet. To achieve the above informing, a new IE can be added to the RRC message, or a new RRC message can be dedicated for such a purpose. In one embodiment, a higher priority control plane transport tunnel can be reserved between the MeNB and the SeNB so that an Xn signaling message can be used to indicate the data unit index as well. This can support the TDM-based dual connectivity while minimizing UE impacts.

After the UE switches back to the MeNB, the MeNB can remove all the user data which has been mirrored to the SeNB and that has been successfully transmitted to the UE. The MeNB can then start to calculate the amount of user data to be mirrored in a next cycle.

Embodiments of the present invention can be used in conjunction with high bandwidth downlink traffic. The DL data arrival rate can be high so that the MeNB can have certain accumulated buffered data before the UE switches from the MeNB to the SeNB. This can happen in cellular networks with cloud RANs supporting content-distribution. As such, the eNB may be connected with a large content server, or the MeNB can work in a high-load status due to a large number of UEs that are camped on a macro cell. For such traffic, the MeNB can buffer some traffic without using too much macro eNB resources and can allow more traffic to be served by the SeNB. Meanwhile, latency and latency jitter can be minimized, and the SeNB radio resources can be fully utilized.

Figure 2:
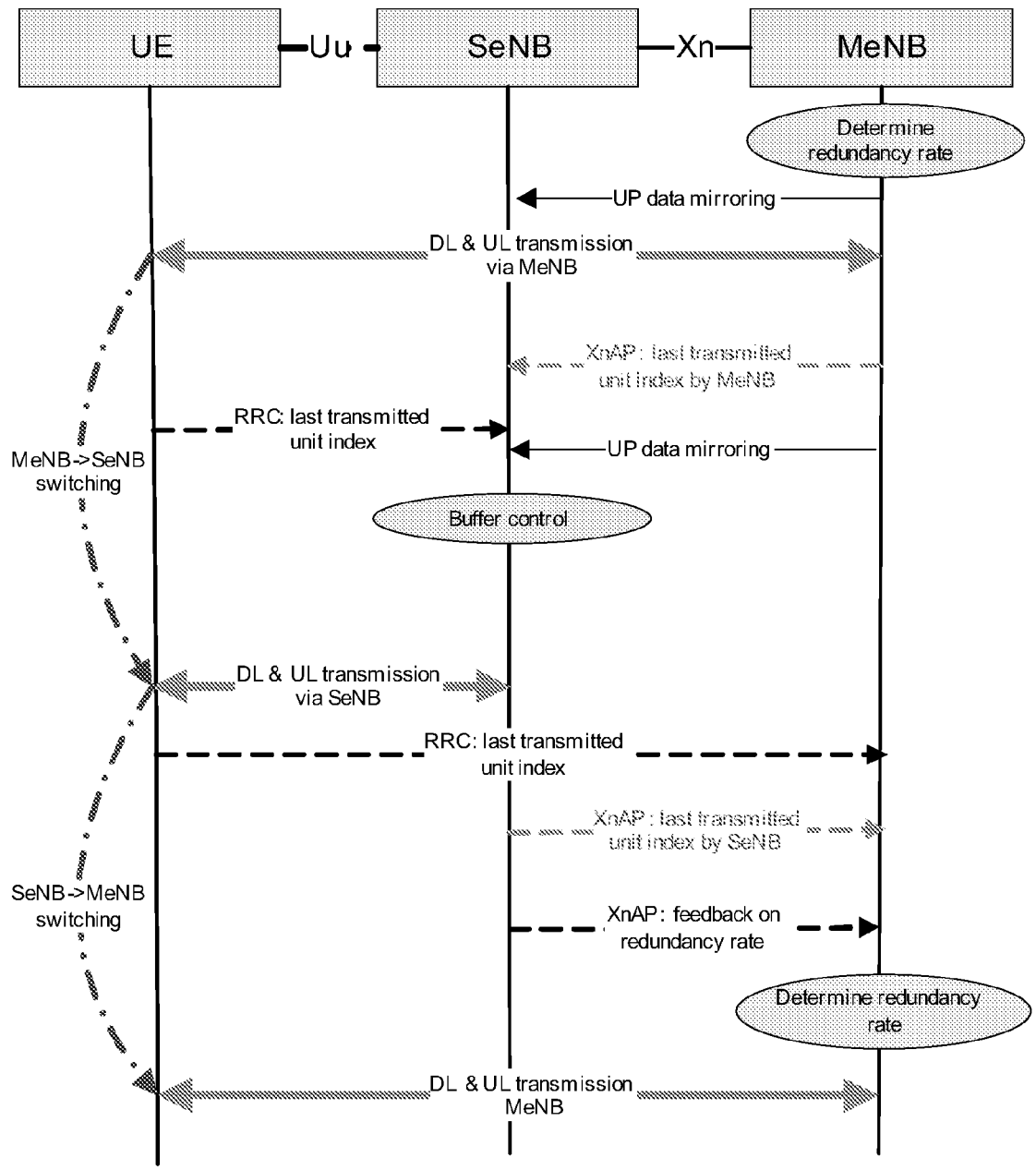
FIG. 2 illustrates an example procedure in accordance with one embodiment of the present invention.

FIG. 2 illustrates an example procedure in accordance with one embodiment of the present invention. As shown in FIG. 2, in order to indicate a last data unit transmitted or next data unit to transmit by the MeNB or the SeNB, one embodiment can use new and/or extended RRC messages. The UE can transmit an indication of either the last data unit that has been transmitted already, or an indication of the next data unit to transmit. Another embodiment can reserve a high priority control plane transmission tunnel between the MeNB and the SeNB, and can also use Xn AP messages to indicate the last data unit. As described above, such embodiments can reduce impacts to the UE during switching. The UE can save the control signaling and can also reduce standardization efforts to support such TDM-based dual connectivity for a single RX/TX UE.

The timing of a buffering operation can be determined by the TDM pattern selected and/or the minimum time granularity, e.g., sub-frames.

The amount of UP data to be mirrored to the SeNB could have some redundancy to allow for maximum usage of SeNB radio resources. This means, more UP data (than the amount which can be transmitted by the SeNB in a cycle) can be mirrored to the SeNB before switching. Upon switching back to the MeNB, it is possible that not all the mirrored UP data has been transmitted. Then, after the UE has switched to the MeNB, the SeNB can remove the data which has been transmitted to the UE. UP data mirroring in the SeNB can be continued and the SeNB can remove all the UP data units which have been transmitted to the UE via the macro eNB.

For UP data mirroring operations, PDCP or RLC PDU can be packetized in the MeNB and then mirrored to the SeNB. If PDCP or RLC packetization is performed in the SeNB, the MeNB can just mirro the bytes of the UP data and be informed of the byte index.

From an entity/device point of view, the operations can be summarized as follows. From the perspective of the MeNB, during preparation of switching between the MeNB and the SeNB, the MeNB can get the SeNB's physical-layer-transmission capability (like the SeNB's modulation and coding scheme (MCS), carrier bandwidth, etc.) information via the Xn interface.

The MeNB can monitor the delay and delay jitter between the MeNB and the SeNB. The MeNB can determine a redundancy rate based on, at least, (1) an SeNB transmission capability, (2) the delay jitter over the Xn interface, and (3) a TDM pattern for switching. The MeNB can mirro a certain amount of user data to the SeNB considering and/or based upon the redundancy rate.

In the event of switching from the MeNB to the SeNB by the UE, the MeNB can inform the SeNB about the last data unit index via the Xn interface (another alternative is that the UE can inform the SeNB of the last data unit index via the Uu interface). The MeNB can transmit an indication of the time to switch.

In the event of switching from the SeNB to the MeNB by the UE, the MeNB can be informed of the last data unit index from the SeNB via the Xn interface (another alternative is that the UE informs the MeNB of the last data unit index via the Uu interface). The MeNB can remove the user data which has been successfully transmitted by the SeNB. The MeNB can start transmitting to the UE from the next data unit.

Next, from the perspective of the SeNB, during the preparation of switching between the MeNB and the SeNB, the SeNB can transmit the SeNB's physical layer transmission capability (like MCS, carrier bandwidth) information to the MeNB via the Xn interface. The SeNB can monitor the delay and delay jitter between the MeNB and the SeNB. The SeNB can receive user data to be mirrored from the MeNB.

In the event of switching from the MeNB to the SeNB, the SeNB can receive the last data unit index or the next data unit index to be transmitted from the MeNB via the Xn interface (another alternative is that the UE informs the SeNB of the last data unit index via the Uu interface). The SeNB can remove the user data which was mirrored in the SeNB and has been successfully transmitted by the MeNB. The SeNB can start transmitting to the UE from the next data unit.

In the event of switching from the SeNB to the MeNB, the SeNB can send the last data unit index to the MeNB via the Xn interface (another alternative is that the UE can inform the MeNB of the last data unit index via the Uu interface). The SeNB can transmit an indication of the time for the UE to switch. The SeNB can remove the user data which was mirrored in the SeNB and that has been successfully transmitted by the SeNB.

Next, from the perspective of the UE, in the event of switching from the MeNB to the SeNB, the UE can receive data. The UE can receive an indication to switch. The UE can inform the last data unit index to the SeNB. During switching from the SeNB to the MeNB, the UE can receive data. The UE can receive an indication to switch. The UE can inform the last data unit index to the MeNB. Handover generally does not occur during switching between the MeNB and the SeNB.

Embodiments of the present invention can include some redundancy so that user data transmitted to and from the UE can avoid delay, and can especially avoid delays resulting from jitter over the Xn interface.

Embodiments of the present invention are applicable to both an UP option with PDCP PDU transported between the MeNB and the SeNB, and also the option with RLC PDU transported between the MeNB and the SeNB.

Figure 3:
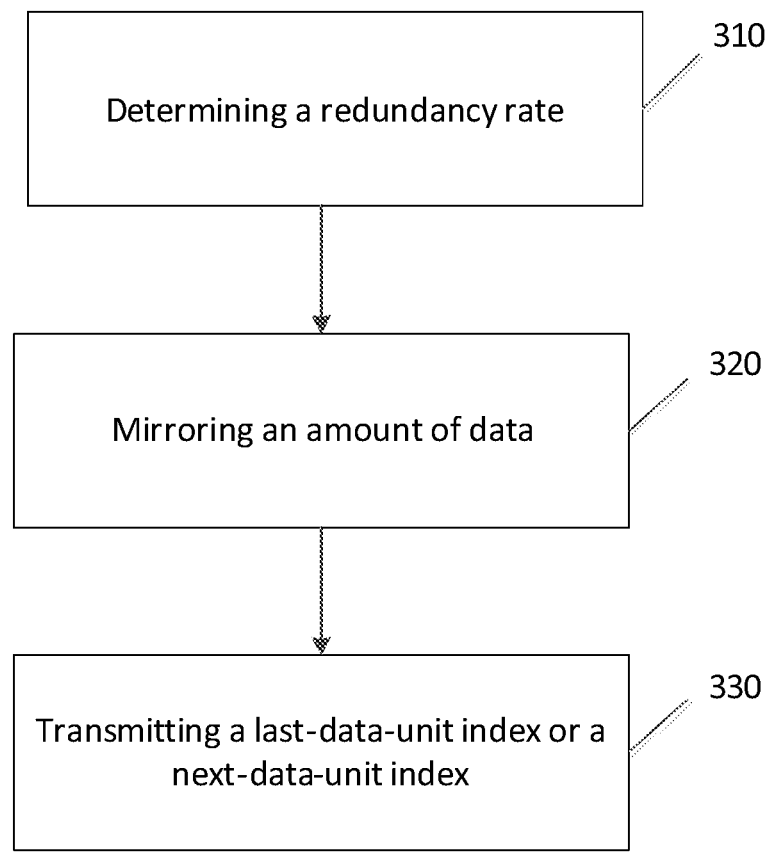
FIG. 3 illustrates a logic flow diagram of a method according to embodiments of the invention.

In view of the above, embodiments of the present invention allow for reduced latency and latency jitter for TDM-based dual connectivity. Embodiments of the present invention can provide a dynamic TDM pattern and redundancy rate that can support more efficient radio resource utilization in TDM-based dual connectivity FIG. 3 illustrates a logic flow diagram of a method according to embodiments of the invention. The method in FIG. 3 includes, at 310, determining a redundancy rate. At 320, the method can include mirroring an amount of data from a first node to a second node based upon the determined redundancy rate. At 330, the method can include transmitting a last-data-unit index or a next-data-unit index.

Figure 4:
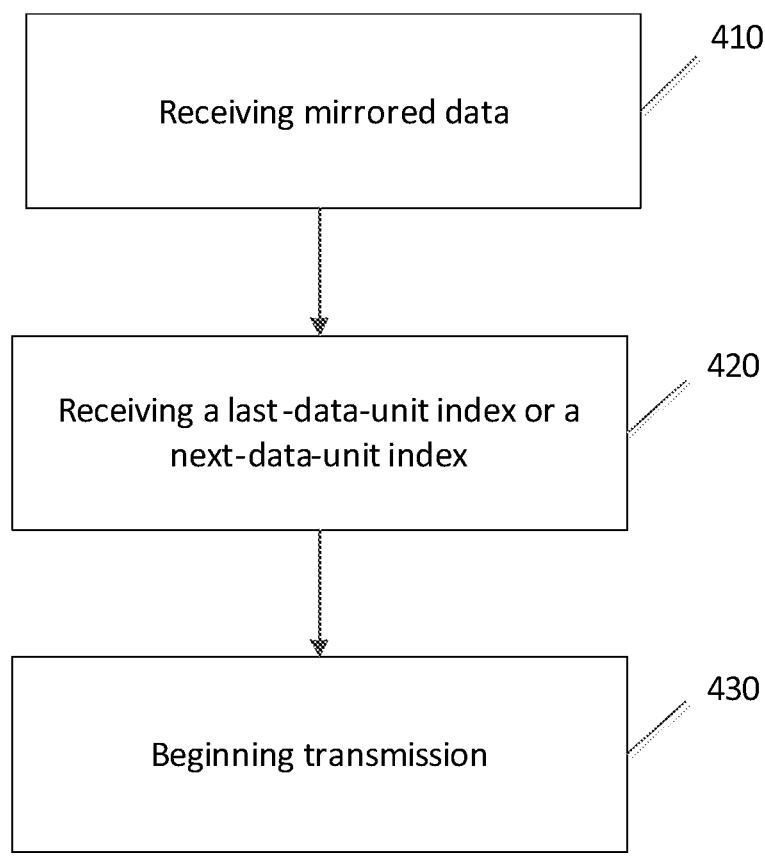
FIG. 4 illustrates a logic flow diagram of a method according to embodiments of the invention.

FIG. 4 illustrates a logic flow diagram of a method according to embodiments of the invention. The method can include, at 410, receiving, by a second node, mirrored data from a first node. At 420, the method can include receiving a last-data-unit index or a next-data-unit index. At 430, the method can include beginning transmission to a user equipment in accordance with the received data-unit index.

Figure 5:
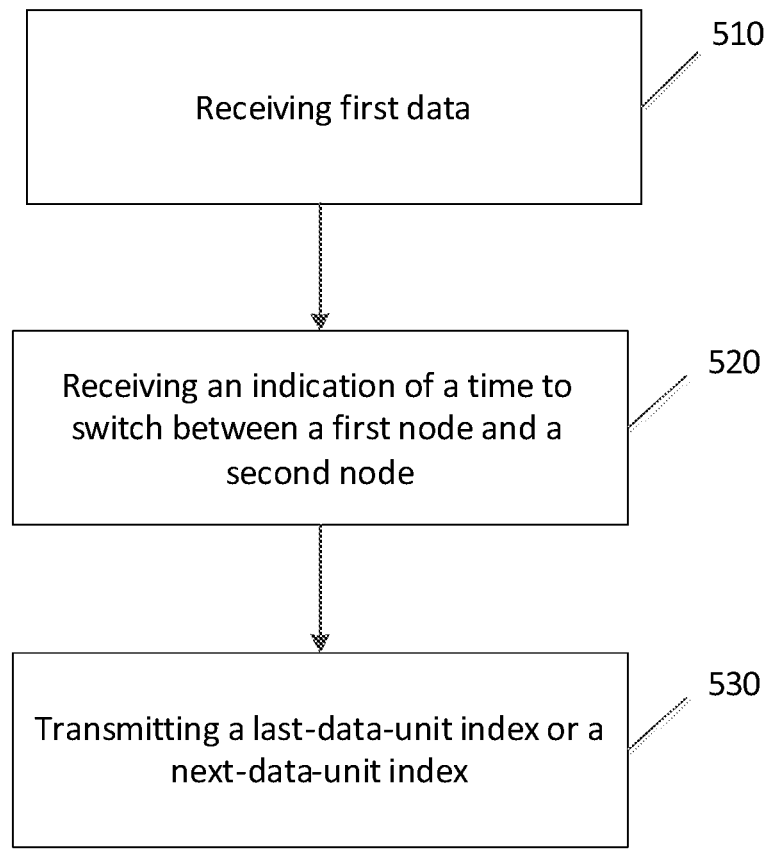
FIG. 5 illustrates a logic flow diagram of a method according to embodiments of the invention.

FIG. 5 illustrates a logic flow diagram of a method according to embodiments of the invention. The method can include, at 510, receiving, by a user equipment, first data. The method can also include, at 520, receiving, by the user equipment, an indication of a time to switch between a first node and a second node. The method can also include, at 530, transmitting a last-data-unit index or a next-data-unit index to the first node or to the second node.

Figure 6:
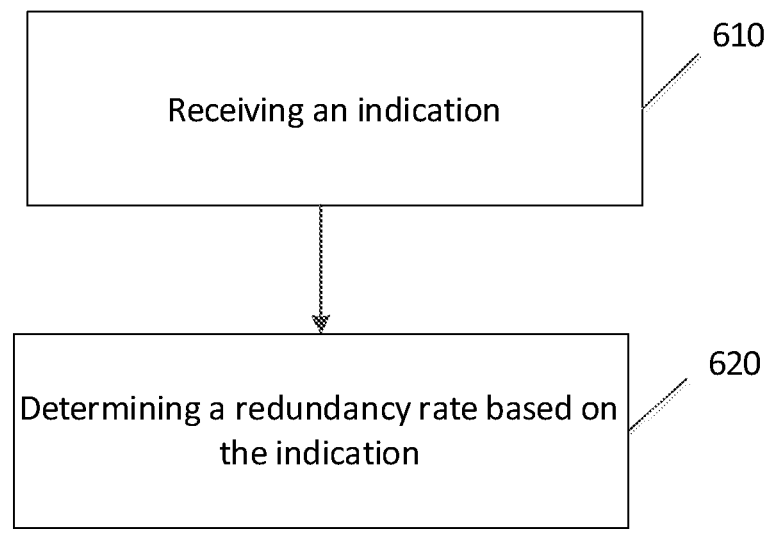
FIG. 6 illustrates a logic flow diagram of a method according to embodiments of the invention.

FIG. 6 illustrates a logic flow diagram of a method according to embodiments of the invention. The method can include, at 610, receiving, by a first node, an indication of whether a second node has fully transmitted mirrored data to a user equipment. The method can include, at 620, determining a redundancy rate based on the indication. The redundancy rate is reduced if the indication indicates that the second node fully transmitted the mirrored data to the user equipment. The redundancy rate is increased if the indication indicates that the second node did not fully transmit the mirrored data to the user equipment.

Figure 7:
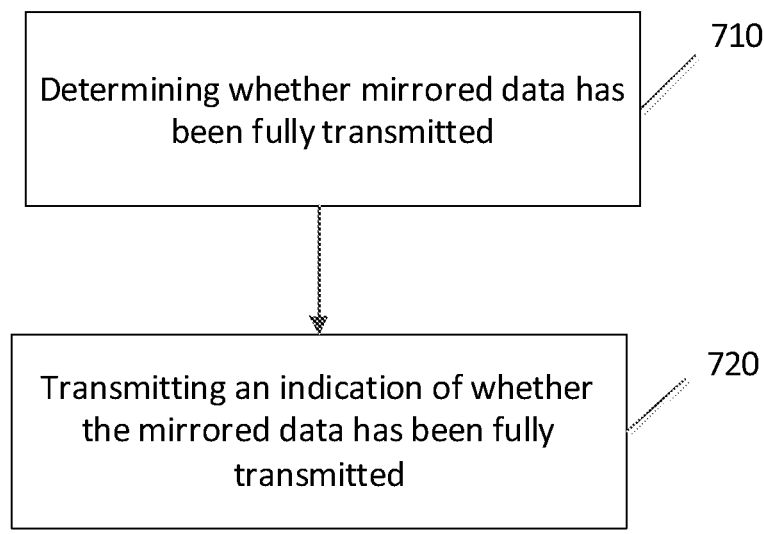
FIG. 7 illustrates a logic flow diagram of a method according to embodiments of the invention.

FIG. 7 illustrates a logic flow diagram of a method according to embodiments of the invention. The method can include, at 710, determining whether mirrored data has been fully transmitted to a user equipment. The method can also include, at 720, transmitting, by a second node, an indication of whether the mirrored data has been fully transmitted. The indication is transmitted to a first node.

Figure 8:
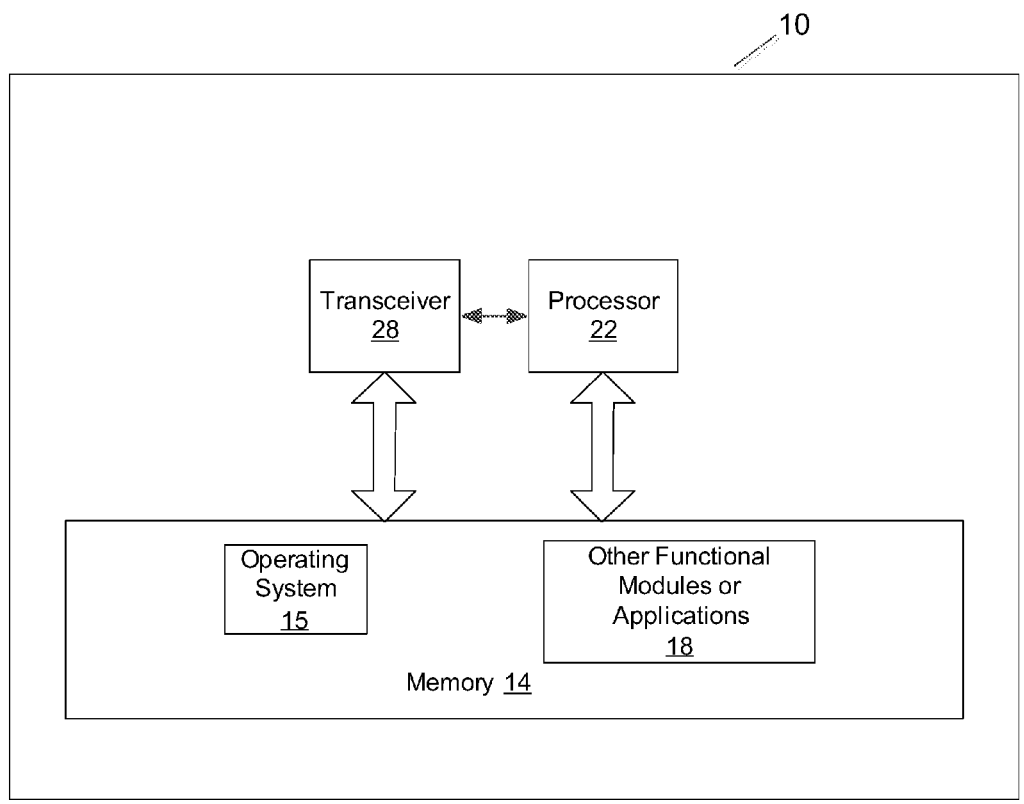
FIG. 8 illustrates an apparatus according to embodiments of the invention.

FIG. 8 illustrates an apparatus 10 according to embodiments of the invention. Apparatus 10 can be a node, such as a macro-evolved-Node-B and/or a small-cell-evolved-Node-B, for example. In other embodiments, apparatus 10 can be a user equipment, for example.

Apparatus 10 can include a processor 22 for processing information and executing instructions or operations. Processor 22 can be any type of general or specific purpose processor. While a single processor 22 is shown in FIG. 8, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In certain embodiments, memory 14 stores software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 9:
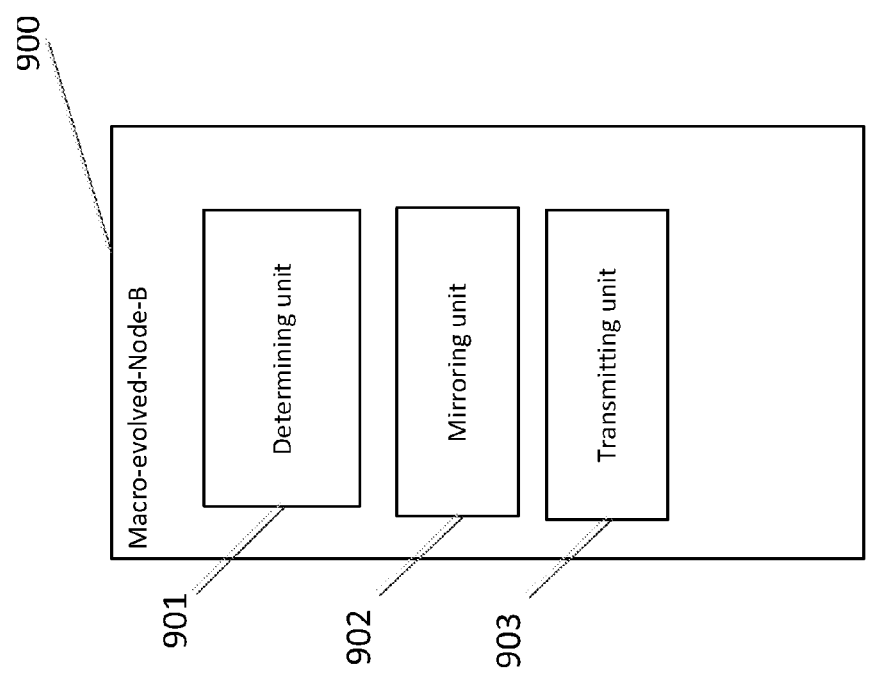
FIG. 9 illustrates an apparatus according to embodiments of the invention.

FIG. 9 illustrates an apparatus 900 according to other embodiments of the invention. Apparatus 900 can be, for example, a macro-evolved-Node-B. Apparatus 900 can comprise a determining unit 901 for determining a redundancy rate. Apparatus 900 can also include a mirroring unit 902 for mirroring an amount of data to a node based upon the determined redundancy rate. Apparatus 900 can also include a transmitting unit 903 for transmitting a last-data-unit index or a next-data-unit index.

Figure 10:
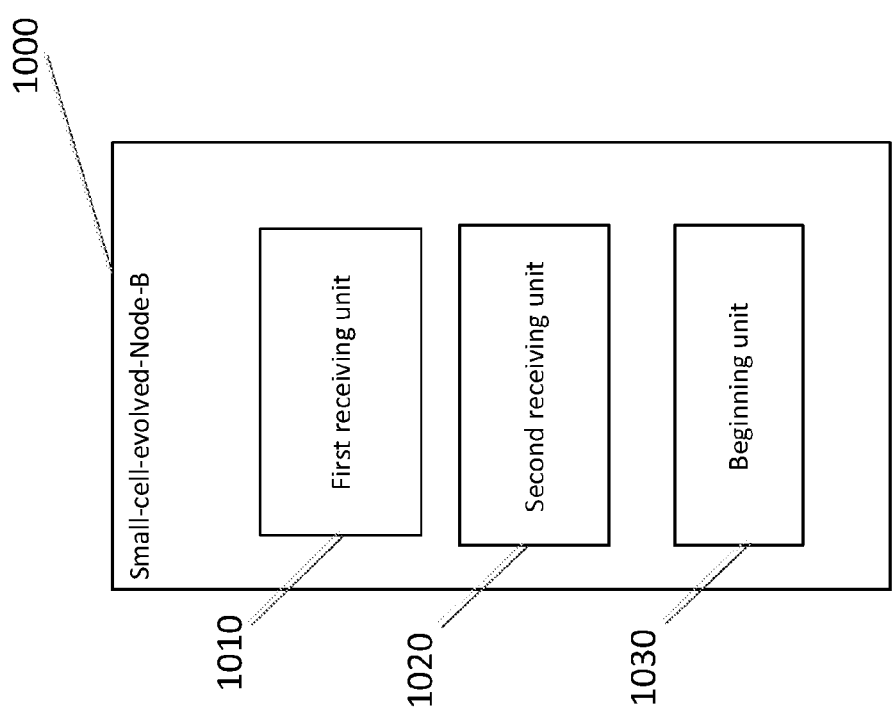
FIG. 10 illustrates an apparatus according to embodiments of the invention.

FIG. 10 illustrates an apparatus 1000 according to other embodiments of the invention. Apparatus 1000 can be, for example, a small-cell-evolved-Node-B. Apparatus 1000 can comprise a first receiving unit 1010 for receiving mirrored data from a node. Apparatus 1000 can comprise a second receiving unit 1020 for receiving a last-data-unit index or a next-data-unit index. Apparatus 1000 can comprise a beginning unit 1030 for beginning transmission to a user equipment in accordance with the received data-unit index.

Figure 11:
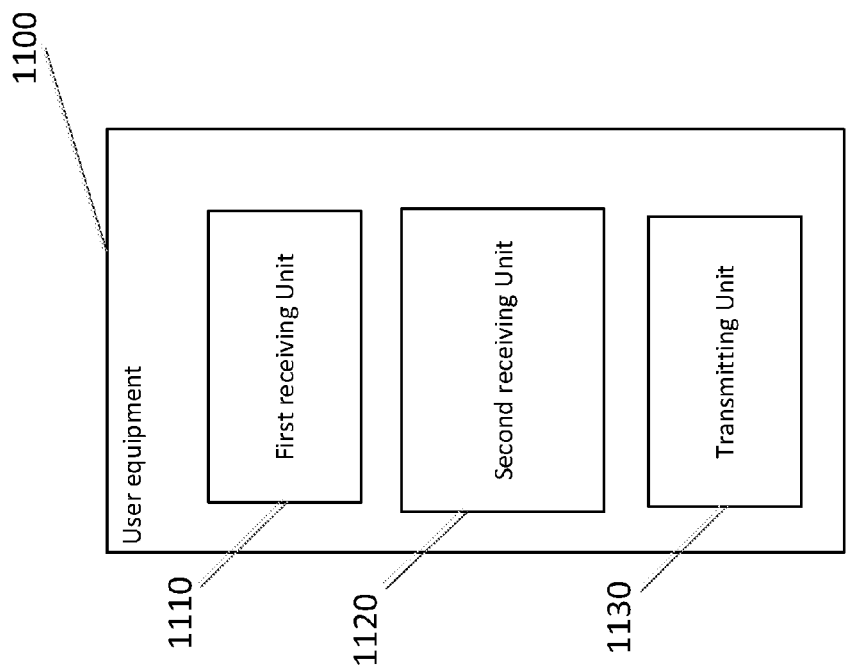
FIG. 11 illustrates an apparatus according to embodiments of the invention.

FIG. 11 illustrates an apparatus 1100 according to other embodiments of the invention. Apparatus 1100 can be, for example, a user equipment. Apparatus 1100 can comprise a first receiving unit 1110 for receiving first data. Apparatus 1100 can also include a second receiving unit 1120 for receiving an indication of a time to switch between a first node and a second node. Apparatus 1100 can also include a transmitting unit 1130 for transmitting a last-data-unit index or a next-data-unit index to the first node or to the second node.

Figure 12:
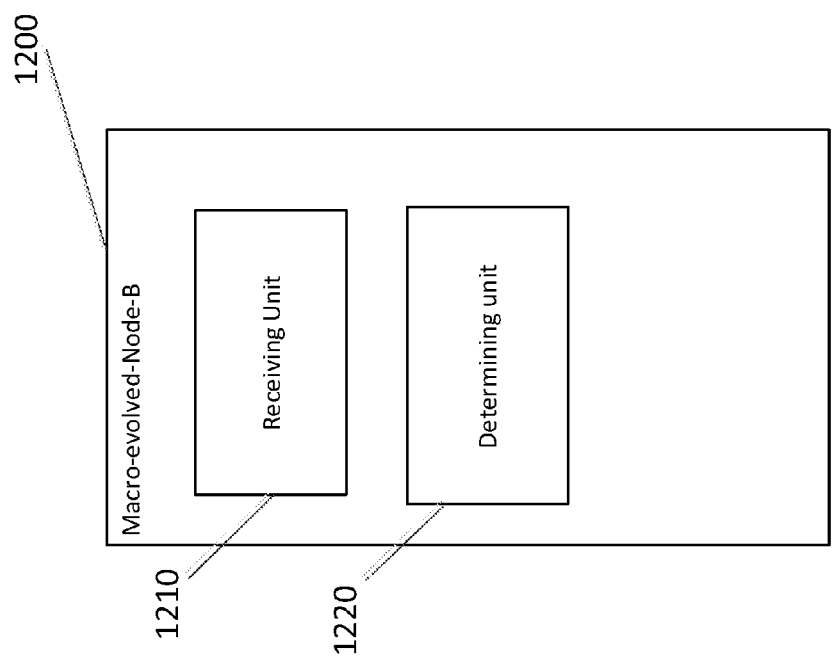
FIG. 12 illustrates an apparatus according to embodiments of the invention.

FIG. 12 illustrates an apparatus 1200 according to other embodiments of the invention. Apparatus 1200 can be, for example, a macro-evolved-Node-B. Apparatus 1200 can comprise a receiving unit 1210 for receiving an indication of whether a node has fully transmitted mirrored data to a user equipment. Apparatus 1200 can also include a determining unit 1220 for determining a redundancy rate based on the indication. The redundancy rate is reduced if the indication indicates that the node fully transmitted the mirrored data to the user equipment. The redundancy rate is increased if the indication indicates that the node did not fully transmit the mirrored data to the user equipment.

FIG. 13 illustrates an apparatus 1300 according to other embodiments of the invention. Apparatus 1300 can be, for example, a small-cell-evolved-Node-B. Apparatus 1300 can comprise a determining unit 1310 for determining whether mirrored data has been fully transmitted to a user equipment. Apparatus 1300 can include a transmitting unit 1320 for transmitting an indication of whether the mirrored data has been fully transmitted. The indication is transmitted to a node.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

What is claimed is:

1. A method, comprising:
   determining, at a first base station, a redundancy rate, wherein the redundancy rate includes a rate of data to be mirrored between the first base station and a second base station at a time of mirroring based on a delay jitter, wherein the first base station comprises a macro-evolved-Node-B and the second base station comprises a small-cell-evolved-Node-B;
   after determining the redundancy rate, mirroring an amount of the data from the first base station to the second base station based upon the determined redundancy rate, wherein the mirroring of the amount of the data includes transmitting, by the first base station, the amount of the data to the second base station without removal of the amount of the data from the first base station within a predetermined time;
   transmitting a last-data-unit index or a next-data-unit index;
   receiving, by the first base station, information relating to a transmission capability of the second base station node, wherein the transmission capability includes a capability of the second base station to transmit data via a physical layer.

2. The method according to claim 1, wherein the transmitting the last-data-unit index or the next-data-unit index comprises transmitting to a user equipment or the second base station.

3. The method according to claim 1, further comprising monitoring a delay between the first base station and the second base station.

4. The method according to claim 1, wherein determining the redundancy rate comprises determining the redundancy rate based on a received transmission capability and a monitored delay.

5. The apparatus according to claim 1, wherein the determining the redundancy rate comprises determining an amount of the data to be mirrored each time mirroring occurs.

6. An apparatus, comprising:
   at least one processor; and
   at least one memory including computer program code, the at least one memory and the computer program code configured, with the at least one processor, to cause the apparatus at least to
   determine, at a first base station, a redundancy rate, wherein the redundancy rate includes a rate of data to be mirrored between the first base station and a second base station, including the apparatus, at a time of mirroring based on a delay jitter, wherein the first base station comprises a macro-evolved-Node-B and the second base station comprises a small-cell-evolved-Node-B;
   after determining the redundancy rate, mirror an amount of the data to the second base station based upon the determined redundancy rate, wherein the mirroring of the amount of the data includes transmitting, by the first base station, the amount of the data to the node without removal of the amount of the data from the apparatus within a predetermined time;
   transmit a last-data-unit index or a next-data-unit index; and
   receive information relating to a transmission capability of the apparatus, wherein the transmission capability includes a capability of the apparatus to transmit data via a physical layer.

7. The apparatus according to claim 6, wherein the transmitting the last-data-unit index or the next-data-unit index comprises transmitting to a user equipment or the node.

8. The apparatus according to claim 6, further comprising transmitting an indication to a user equipment that is connected to the apparatus, wherein the indication indicates to the user equipment to switch connection from the apparatus to the node.

9. The apparatus according to claim 6, wherein the apparatus is further caused to monitor a delay between the apparatus and an other of the first base station and the second base station.

10. The apparatus according to claim 6, wherein determining the redundancy rate comprises determining the redundancy rate based on a received transmission capability and a monitored delay.

11. The apparatus according to claim 6, wherein the determining the redundancy rate comprises determining an amount of the data to be mirrored each time mirroring occurs.

12. An apparatus, comprising:
at least one processor; and
at least one memory including computer program code, the at least one memory and the computer program code configured, with the at least one processor, to cause the apparatus at least to
receive mirrored data from a first base station, wherein the apparatus comprises a second base station in a plurality of network nodes, and the mirrored data includes data sent, after determining a redundancy rate, to the apparatus without removal of the data from the first base station within a predetermined time based on the redundancy rate, and wherein the redundancy rate includes a rate of the data to be mirrored between the first base station and the second base station at a time of mirroring based on a delay jitter, wherein the first base station comprises a macro-evolved-Node-B and the second base station comprises a small-cell-evolved-Node-B;
receive a data-unit index, wherein the received data-unit index comprises a last-data-unit index or a next-data-unit index; and
begin transmission to a user equipment in accordance with the received data-unit index;
transmit information relating to a transmission capability of the apparatus to the first base station.

13. The apparatus according to claim 12, wherein the apparatus is further caused to monitor a delay between the first base station and the apparatus.

14. The apparatus according to claim 12, wherein the receiving the last-data-unit index or the next-data-unit index comprises receiving from the first base station or a user equipment.

* * * * *